(12) United States Patent
Dragic et al.

(10) Patent No.: US 11,476,634 B2
(45) Date of Patent: Oct. 18, 2022

(54) RARE EARTH-DOPED MULTICOMPONENT FLUOROSILICATE OPTICAL FIBER FOR OPTICAL DEVICES

(71) Applicants: The Board of Trustees of the University of Illinois, Urbana, IL (US); Clemson University, Clemson, SC (US)

(72) Inventors: Peter Dragic, Champaign, IL (US); John Ballato, Clemson, SC (US); Maxime Cavillon, Paris (FR)

(73) Assignees: THE BOARD OF TRUSTEES OF THE UNIVERSITY OF ILLINOIS, Urbana, IL (US); CLEMSON UNIVERSITY, Clemson, SC (US)

( * ) Notice: Subject to any disclaimer, the term of this patent is extended or adjusted under 35 U.S.C. 154(b) by 85 days.

Patent file contains an affidavit/declaration under 37 CFR 1.130(b).

(21) Appl. No.: 16/404,955

(22) Filed: May 7, 2019

(65) Prior Publication Data

US 2019/0341737 A1 Nov. 7, 2019

Related U.S. Application Data

(60) Provisional application No. 62/667,650, filed on May 7, 2018.

(51) Int. Cl.
*H01S 3/17* (2006.01)
*H01S 3/16* (2006.01)
*H01S 3/067* (2006.01)

(52) U.S. Cl.
CPC ........ *H01S 3/1698* (2013.01); *H01S 3/06733* (2013.01); *H01S 3/06754* (2013.01); *H01S 3/173* (2013.01); *H01S 3/176* (2013.01)

(58) Field of Classification Search
CPC .. H01S 3/173; H01S 3/176; H01S 3/16–1618; H01S 3/1631; H01S 3/1636;
(Continued)

(56) References Cited

U.S. PATENT DOCUMENTS 5,798,306 A * 8/1998 Dickinson, Jr. ......... C03C 3/062
501/57
6,374,641 B1 4/2002 Chu et al.
(Continued)

FOREIGN PATENT DOCUMENTS

EP 0 733 600 B1 1/2000

OTHER PUBLICATIONS

N. Yu et al. "Low Quantum Defect Fiber Lasers via Yb-Doped Multicomponent Fluorosilicate Optical Fiber" OSA, pp. 1-2, 2018 (Year: 2018).*
(Continued)

*Primary Examiner* — Xinning (Tom) Niu
*Assistant Examiner* — Delma R Fordé
(74) *Attorney, Agent, or Firm* — Crowell & Moring LLP

(57) ABSTRACT

A rare earth-doped optical fiber comprises a fluorosilicate core surrounded by a silica cladding, where the fluorosilicate core comprises an alkaline-earth fluoro-alumino-silicate glass, such as a strontium fluoro-alumino-silicate glass. The rare earth-doped optical fiber may be useful as a high-power fiber laser and/or fiber amplifier. A method of making a rare earth-doped optical fiber comprises: inserting a powder mixture comprising $YbF_3$, $SrF_2$, and $Al_2O_3$ into a silica tube; after inserting the powder mixture, heating the silica tube to a temperature of at least about 2000° C., some or all of the powder mixture undergoing melting; drawing the silica tube to obtain a reduced-diameter fiber; and cooling the reduced-
(Continued)

diameter fiber. Thus, a rare earth-doped optical fiber comprising a fluorosilicate core surrounded by a silica cladding is formed.

10 Claims, 4 Drawing Sheets

(58) Field of Classification Search
CPC ....... H01S 3/1655; H01S 3/067–06716; G02B 6/02–08; G02B 6/036; G02B 2006/1208; G02F 1/365; G02F 1/377; G02F 1/383; C03B 2201/34; C03C 13/00–048
See application file for complete search history.

(56) References Cited

U.S. PATENT DOCUMENTS

| | | | | |
|---|---|---|---|---|
| 6,385,384 | B1* | 5/2002 | Wei | C03B 37/01433 385/141 |
| 6,587,633 | B2* | 7/2003 | Bagnasco | C03C 4/0071 385/123 |
| 8,774,590 | B2 | 7/2014 | Ichii et al. | |
| 2003/0026565 | A1* | 2/2003 | Anderson | G02B 6/2551 385/123 |
| 2006/0029344 | A1 | 2/2006 | Farroni et al. | |
| 2011/0141758 | A1* | 6/2011 | Seo | H01S 3/094019 362/553 |
| 2016/0083284 | A1 | 3/2016 | Sen et al. | |

OTHER PUBLICATIONS

Tianfu Yao et al. "Tandem-pumped ytterbium-doped aluminosilicate fiber amplifier with low quantum defect" OSA, pp. 1-2, 2012 (Year: 2012).*
P. Dragic et al. "Yb-Doped Alkaline Earth Alumino- and Fluoro-AluminoSilicate Optical Fiber", OSA, pp. 1-2, 2017 (Year: 2017).*
P. Dragic et al. "Yb-Doped Fluorosilicate Optical Fiber Development for Laser Cooling and Radiation Balancing Applications", OSA, pp. 1-2, 2017 (Year: 2017).*
John Ballatoa et al. "A Unified Materials Approach to Mitigating Optical Nonlinearities in Fiber Lasers" SPIE Photonics Europe, pp. 1-6, 2018 (Year: 2018).*
Akhilesh Kumar Swarnakar et al. "Improved Prediction of Young's Modulus of Fluorine-Containing Glasses Using MAS-NMR Structural Data" Journal of the American Ceramic Society, pp. 1271-1277. 2013 (Year: 2013).*
Maxime Cavilion et al. "Investigation of the structural environment and chemical bonding offluorine in Yb-doped fluorosilicate glass optical fibres" Elsevier, p. 119-126, 2019 (Year: 2019).*
N. Yu et al. "Less than 1% quantum defect fiber lasers via ytterbium-doped multicomponent fluorosilicate optical fiber" Optical Letters, vol. 43, No. 13,pp. 3096-3099, Jul. 1, 2018, (Year: 2018).*
P. Dragic et al. "Low Nonlinearity Yb-Doped Fluorosilicate Optical Fiber With Ultra-Flat Absorption Spectrum" OSA, pp. 1-2, 2017 (Year: 2017).*
S. Yoo et al. "Ytterbium-doped Y2O3 nanoparticle silica optical fibers for high power fiber lasers with suppressed photodarkening" Optics Communications 283, pp. 3423-3427 (2010) (Year: 2010).*
J. W. Fleming et al. "Refractive index dispersion and related properties in fluorine doped silica" Applied Optics / vol. 22, No. 19, pp. 3102-3104, Oct. 1, 1983 (Year: 1983).*
T. Ribeiro et al. "Heavily Yb-doped silicate glass thick films" J Sol-Gel Sci Technol (2017), pp. 105-113 (Year: 2017).*

Ballato et al., "Rethinking Optical Fiber: New Demands, Old Glasses," J. Am. Ceram. Soc., 96:9, (2013) pp. 2675-2692.
Barnard et al., "Analytical Model for Rare-Earth-Doped Fiber Amplifiers and Lasers," IEEE Journal of Quantum Electronics, 30:8 (Aug. 1994) pp. 1817-1830.
Cavillon et al., "Oxyfluoride Core Silica-Based Optical Fiber With Intrinsically Low Nonlinearities for High Energy Laser Applications," Journal of Lightwave Technology, 36:2 (Jan. 15, 2018) pp. 284-291.
Cavillon et al., "Ytterbium-doped multicomponent fluorosilicate optical fibers with intrinsically low optical nonlinearities," Optical Materials Express, 8:4, (Apr. 2018) pp. 744-760.
Chen, et al., "10 kW-level spectral beam combination of two high power broad-linewidth fiber lasers by means of edge filters," Optics Express, 25:26 (Dec. 2017) pp. 32783-32791.
Chu et al., "1030 nm high power polarization maintained fiber laser with narrow linewidth and near-diffraction-limited beam quality," Proceedings of SPIE, vol. 10710 (Mar. 5, 2018) pp. 1-5.
Dawson et al., "Analysis of the scalability of diffraction-limited fiber lasers and amplifiers to high average power," Optics Express, 16:17, (Aug. 18, 2008) pp. 13240-13266.
Dong, Liang, "Stimulated thermal Rayleigh scattering in optical fibers," Optic Express 21:3, (Feb. 11, 2013) pp. 2642-2656.
Gu et al., "Highly efficient ytterbium-doped phosphosilicate fiber lasers operating below 1020nm," Optics Express 23:14, (Jun. 29, 2015), pp. 17693-17700.
Huang et al., "Performance of kW class fiber amplifers spanning a broad range of wavelengths: 1028~1100nm," Proceedings of SPIE, vol. 8961 (Mar. 2, 2014) pp. 1-6.
Jauregui et al., "High-power fibre lasers," Nature Photonics, vol. 7, (Oct. 20, 2013), pp. 861-867.
Krishnaiah et al., "Development of ytterbium-doped oxyfluoride glasses for laser cooling applications," Scientific Reports, 6:21905 (Feb. 26, 2016), 12 pp.
Lai, et al., "Effective suppression of stimulated Raman scattering in high power fiber amplifiers using double-pass scheme," Proceedings of SPIE, vol. 8961, (2014) pp. 1-7.
Lapointe et al., "Thermal effects in high-power CW fiber lasers," Proceedings of SPIE, vol. 7195, (Feb. 19, 2009) pp. 1-11.
Li et al., "Beam shaping by using small-aperture SLM and DM in a high power laser," Proceedings of SPIE, vol. 10710, pp. 1-16, (Mar. 5, 2018).
Matsubara et al., "Extremely low quantum defect oscillation of Ytterbium fiber laser by laser diode pumping at room temperature," in Advanced Solid-State Photonics, OSA Technical Digest Series (CD) (Optical Society of America, 2007), paper TuB4, 3 pp.
Morasse et al., "Enhanced pulseshaping capabilities and reduction of non-linear effects in all-fiber MOPA pulsed system," Proceedings of SPIE, vol. 7195, (Feb. 19, 2009) pp. 1-12.
Nilsson et al., "Tandem-pumped Fiber Lasers with Low Quantum Defect," Advanced Solid-State Lasers Congress, OSA Technical Digest (online) (Optical Society of America, 2013), paper Atu1A.1; Abstract only.
Richardson et al., High power fiber lasers: current status and future perspectives [Invited], J. Opt. Soc. Am. B, 27:11 (Nov. 2010) pp. B63-B92.
Yao et al., "Ultra-Low Quantum-Defect Heating in Ytterbium-Doped Aluminosilicate Fibers," Journal of Lightwave Technology, 32:3 (Feb. 1, 2014) pp. 429-434.
Zervas et al., "High Power Fiber Lasers: A Review," IEEE Journal of Selected Topics in Quantum Electronics 20:5, (Sep./Oct. 2014), 23 pp.

\* cited by examiner

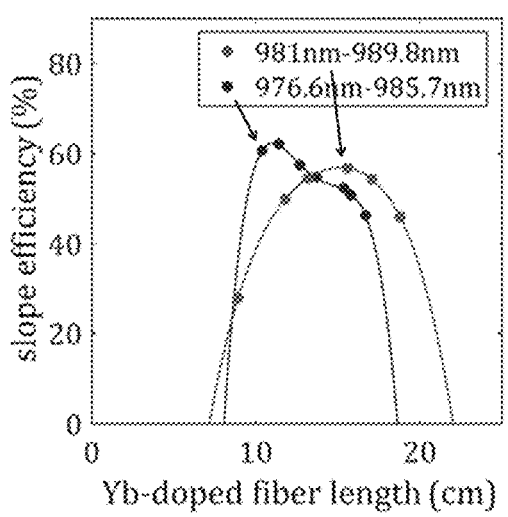
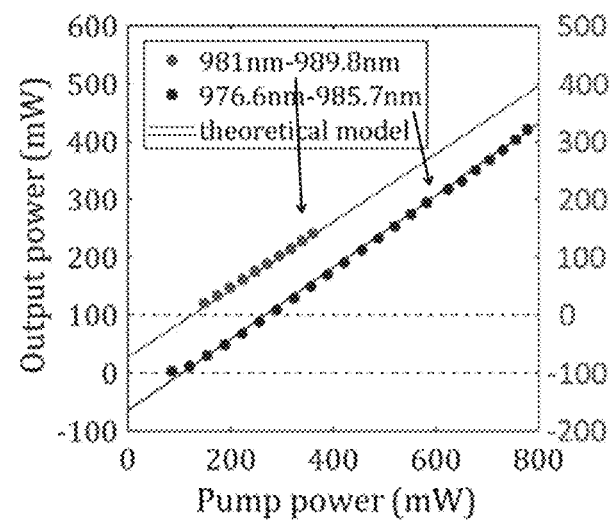
FIG. 9A
FIG. 9B
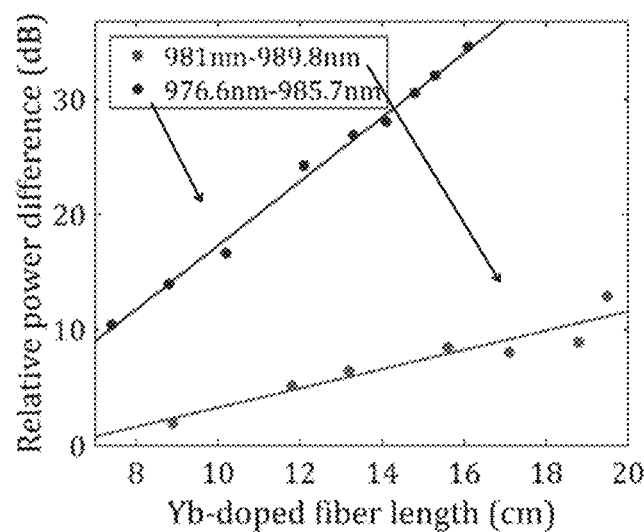
FIG. 10

RARE EARTH-DOPED MULTICOMPONENT FLUOROSILICATE OPTICAL FIBER FOR OPTICAL DEVICES

RELATED APPLICATION

The present patent document claims the benefit of priority under 35 U.S.C. § 119(e) to U.S. Provisional Patent Application No. 62/667,650, which was filed on May 7, 2018, and is hereby incorporated by reference in its entirety.

FEDERALLY SPONSORED RESEARCH OR DEVELOPMENT

This invention was made with government support under grant number FA9550-16-1-0383 awarded by the U.S. Air Force, and grant number N00014-17-1-2546 awarded by the U.S. Navy. The government has certain rights in the invention.

TECHNICAL FIELD

The present disclosure is related generally to optical fibers and more particularly to rare earth-doped fluorosilicate optical fibers and their applications.

BACKGROUND

Optical fibers may function as passive transmission media for guiding optical signals over long distances. Such passive fibers are made optically active by doping with rare earth ions, such as erbium, which have a characteristic emission when pumped by light at suitable wavelengths. Because of this capability, rare earth-doped fibers also have shown great potential for use in a series of active devices, such as fiber lasers.

High-power fiber lasers have made their impact on numerous industrial and defense-related applications, and multi-kW fiber lasers have been realized with good beam quality. The best fibers presently are based on ytterbium doping and operate at wavelengths of about 1 micrometer. However, as the demand for higher laser power continues to grow, thermal management becomes an increasingly important issue. The figure-of-merit quantifying heat generation in an active fiber is the quantum defect (QD), defined as $QD=1-\lambda_p/\lambda_s$, where $\lambda_p$ and $\lambda_s$ are the pump and lasing wavelengths, respectively. Since the pump wavelength is shorter than the lasing wavelength, the QD takes on a value between 0 and 1, and represents the fraction of pump power (in the quantum limit) lost to heat. For example, an aluminosilicate fiber, which typically is pumped at a wavelength of 976 nm and lases at about 1030 nm, exhibits a QD of about 5%. This indicates a 500 W thermal load on an active fiber operating at 10 kW.

Such QD-related heating can lead to problems ranging from the catastrophic to the parasitic. Catastrophic failure of optical fiber clearly represents an upper bound to power scaling, while parasitic effects, such as transverse mode instability (TMI), can have a major impact on beam quality. Therefore, if the QD can be reduced, for example to 1%, the thermal load for the same 10 kW power level would be reduced to 100 W, clearly offering significant mitigation of the aforementioned problems.

BRIEF SUMMARY

A rare earth-doped optical fiber comprises a fluorosilicate core surrounded by a silica cladding, where the fluorosilicate core comprises an alkaline-earth fluoro-alumino-silicate glass, such as a strontium fluoro-alumino-silicate glass. The rare earth-doped optical fiber may be useful as a high-power fiber laser and/or fiber amplifier.

A method of making a rare earth-doped optical fiber comprises: inserting a powder mixture comprising $YbF_3$, $SrF_2$, and $Al_2O_3$ into a silica tube; after inserting the powder mixture, heating the silica tube to a temperature of at least about 1850° C., some or all of the powder mixture undergoing melting; drawing the silica tube to obtain a reduced-diameter fiber; and cooling the reduced-diameter fiber. Thus, a rare earth-doped optical fiber comprising a fluorosilicate core surrounded by a silica cladding is formed.

BRIEF DESCRIPTION OF THE DRAWINGS

FIG. 9A shows slope efficiency for fiber lasers with different ytterbium-doped optical fiber lengths for the two low-QD cases described in this disclosure, where the curves are provided as visual aids.

FIG. 9B shows theoretical and experimental output power versus launched pump power at near the optimal fiber length (11.4 cm for 976.6 nm pumping and 15.6 cm for 981 nm pumping).

FIG. 10 shows the difference between pump leakage and lasing powers at different ytterbium-doped optical fiber lengths for the two low-QD cases described in this disclosure. Data were obtained using 265 mW of pump power, and the lines are simple fits to the data provided as a visual guide.

DETAILED DESCRIPTION

A rare earth-doped multicomponent fluorosilicate optical fiber that offers advantages over conventional silica optical fibers is described herein. The rare earth-doped multicomponent fluorosilicate optical fiber, which may be a yttrium-doped multicomponent fluorosilicate optical fiber, exhibits low optical nonlinearities, including reduced Brillouin and Raman scattering and a lower thermo-optic coefficient, dn/dT, compared to conventional silica optical fibers. In addition, low QD (<1.5%) operation has been achieved from a fiber laser comprising the ytterbium-doped optical fiber, an advance that promises a significant mitigation of issues associated with fiber heating.

For multicomponent silicate optical fibers doped with a sufficient amount of fluorine, it has been found that the ytterbium emission spectrum is nearly identical to that of fluoride glasses. Advantageously, as silicates, these fluorosilicate fibers exhibit a number of desirable features, such as high strength and the ability to be fusion spliced to conventional pump fibers. In addition, the emission spectrum from fluorosilicate fibers is significantly blue-shifted (e.g., sub-1000 nm emission maximum) relative to more conventional aluminosilicate glasses, potentially enabling short-wavelength lasers and/or laser cooling applications.

The rare earth-doped multicomponent fluorosilicate optical fiber may comprise a rare earth dopant selected from the group consisting of: ytterbium (Yb), erbium (Er), neodymium (Nd), thulium (Tm), praseodymium (Pr), and holmium (Ho). Ytterbium may be particularly beneficial for high power laser and amplifier applications, and is included as a dopant in the experimental examples in this disclosure. Accordingly, reference is made throughout this disclosure to a ytterbium-doped optical fiber, but it is understood that the invention is more broadly applicable to rare earth-doped optical fibers comprising any rare earth dopant.

Figure 1:
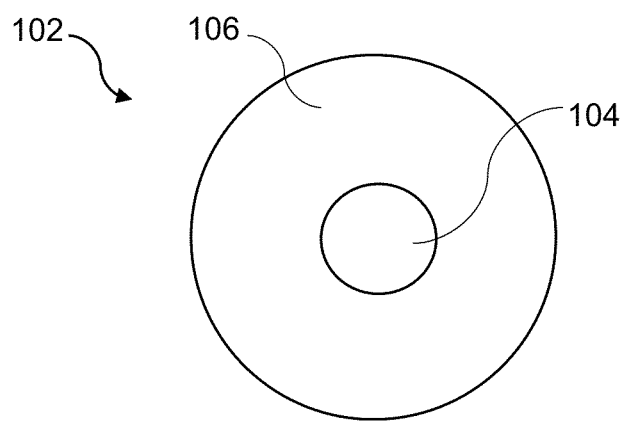
FIG. 1 is a cross-sectional schematic of a rare earth-doped optical fiber, such as a ytterbium-doped multicomponent fluorosilicate optical fiber, which may be more simply referred to as a "ytterbium-doped fluorosilicate optical fiber" or a "ytterbium-doped optical fiber" throughout this disclosure.

Referring to FIG. 1, the ytterbium-doped optical fiber 102 includes a fluorosilicate core 104 surrounded by a silica cladding 106. The fluorosilicate core 104 comprises an alkaline-earth fluoro-alumino-silicate glass, such as a strontium fluoro-alumino-silicate glass. Compositional data described below for an exemplary fiber 102 suggest the fluorosilicate core 104 may include on average about 26-27 at. % silicon (Si), 4-5 at. % fluorine (F), 3-4 at. % strontium (Sr), 2-3 at. % aluminum (Al), and less than 1 at. % (e.g., 0.1-0.5 at. %) ytterbium (Yb), with a remainder being oxygen (O) and any incidental impurities. Generally speaking, the fluorosilicate core may include, on average, a nonzero amount of silicon up to about 35 at. % (e.g., 24-29 at. % Si), a nonzero amount of fluorine up to about 10 at. % (e.g., 3-6 at. % F), a nonzero amount of strontium up to about 8 at. % (e.g., 2-5 at. % Sr), a nonzero amount of aluminum up to about 6 at. % (e.g., 1-4 at. % Al), and a nonzero amount of ytterbium up to about 1 at. % (e.g., 0.1-1 at. % Yb), with the remainder being O and any incidental impurities. The strontium fluoro-alumino-silicate glass may be described as a silicate containing $SrF_2$, $Al_2O_3$, and $YbF_3$. As discussed below in regard to optical fiber fabrication, the compounds $SrF_2$, $Al_2O_3$ and $YbF_3$ are used for forming the fluorosilicate core. For an alkaline-earth fluoro-alumino-silicate glass including an alkaline-earth metal other than or in addition to strontium (e.g., beryllium, magnesium, calcium, or barium), and/or for a rare earth dopant other than ytterbium, other compounds may be incorporated. The silica cladding 106 may comprise pure silica ($SiO_2$); in other words, the silica cladding 106 may consist essentially of $SiO_2$. Alternatively, the silica cladding 106 may comprise silica and one or more other oxides, such as alumina ($Al_2O_3$) and/or lanthana ($La_2O_3$).

Figure 2:
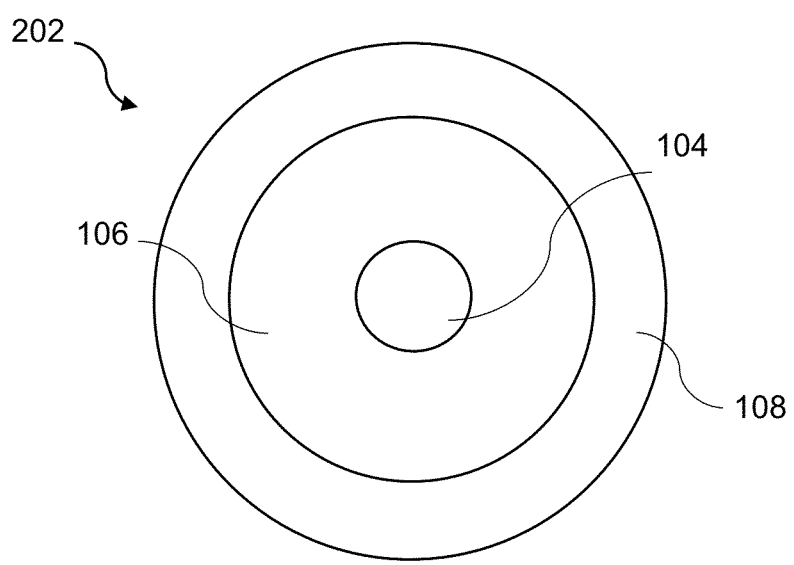
FIG. 2 is a cross-sectional schematic of a rare earth-doped fluorosilicate optical fiber having a double-clad structure.

The ytterbium-doped optical fiber may further comprise an outer cladding layer 108 on the silica cladding 106. In such double-clad ytterbium-doped optical fibers 202, illustrated for example in FIG. 2, the fluorosilicate core 104 may have the highest refractive index and the outer cladding 108 may have the lowest. The outer cladding layer 108 may comprise a polymer or a glass, but is more typically a polymer, such as a low-index fluorinated polymer. An outer cladding 108 may be beneficially applied to the ytterbium-doped optical fiber 102 for high power fiber laser or amplifier applications.

The ytterbium-doped optical fiber 102,202 may also include a polymer coating (e.g., acrylate coating) on the silica cladding 106 or on the outer cladding 108, when present. Typically, the fluorosilicate core 104 has a diameter in a range of from about 5 microns to about 100 microns, or from 5 microns to about 50 microns (e.g., about 11 microns). The silica cladding 106 may have an outer diameter in a range from about 100 microns to about of about 600 microns, or from 100 microns to about 200 microns (e.g., about 125 microns). The optional outer cladding 108 may have an outer diameter in a range from about 150 microns to about 800 microns.

Figure 3:
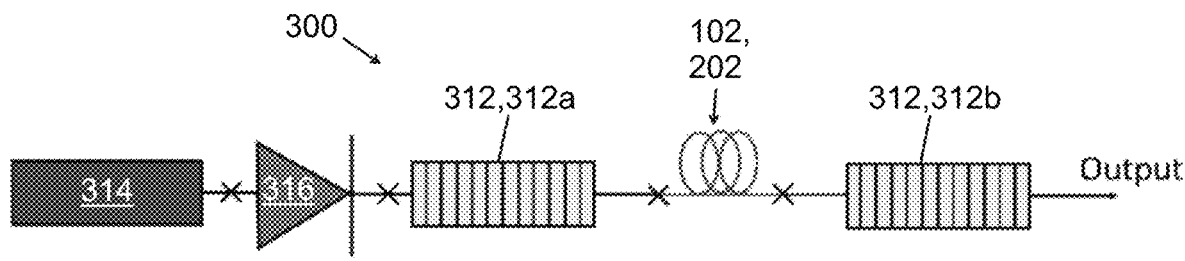
FIG. 3 is a schematic of an exemplary configuration for operation of a fiber laser comprising a rare earth-doped fluorosilicate optical fiber.

Referring to FIG. 3, a fiber laser 300 may comprise the ytterbium-doped optical fiber 102,202 having any or all of the features described in this disclosure. As set forth above, the ytterbium-doped optical fiber 102,202 includes a fluorosilicate core 104 surrounded by a silica cladding 106 and optional outer cladding 108, where the fluorosilicate core 104 comprises a strontium fluoro-alumino-silicate glass. Advantageously, the fiber laser 300 exhibits a quantum defect of less than 1.5%, or less than 1%. For example, at a pump wavelength of 976.6 nm, the QD may be about 0.92% or less, and at a pump wavelength of 981 nm, the QD may be about 0.90% or less, as discussed in the Examples below. This low QD achievement, coupled with a reduction of dn/dT obtained for fluorosilicate glasses, promises an increase in TMI thresholds by up to 10 dB.

The fiber laser 300 shown in FIG. 3 is in optical communication with reflectors 312, which define an optical cavity and are used to increase optical power during laser operation. Generally speaking, the phrase "in optical communication with" means that the fiber laser is positioned with respect to another device (or devices) such that light from the fiber laser can reach the device(s); also or alternatively, light from the device(s) can reach the fiber laser. In this example, the devices are the reflectors 312.

The reflectors 312 may be mirrors or distributed Bragg reflectors, such as fiber Bragg gratings (FBGs). As shown in FIG. 3, a first FBG 312a is spliced to an input end of the ytterbium-doped optical fiber 102,202 and a second FBG 312b is spliced to an output end of the ytterbium-doped optical fiber 102,202, where x indicates a fusion splice. The first FBG 312a may have a reflectivity of at least about 95%, and more typically at least about 99%, and as high as 100%. The second FBG 312b may have a reflectivity in a range from about 5% to about 95%. The experimental or commercial configuration for operation of the fiber laser 300 may further include a pump laser (e.g., a single-mode diode laser) 314 and an optical isolator 316 to avoid feedback from the first and second FBGs 312a,312b.

Figure 4:
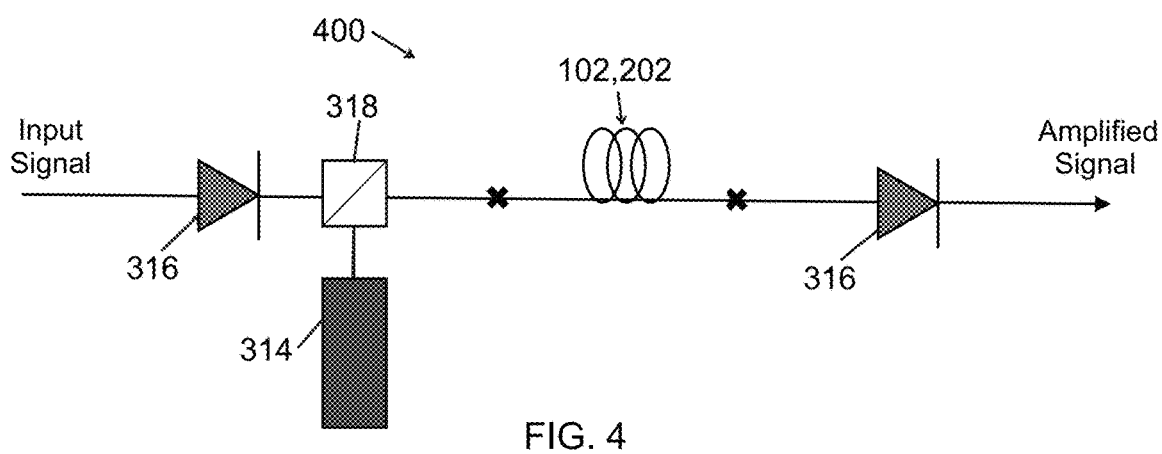
FIG. 4 is a schematic of an exemplary configuration for operation of a fiber amplifier comprising a rare earth-doped fluorosilicate optical fiber.

Referring to FIG. 4, a fiber amplifier 400 may be constructed with the ytterbium-doped optical fiber 102,202 having any or all of the features described in this disclosure. As described above, the ytterbium-doped optical fiber 102, 202 includes a fluorosilicate core 104 surrounded by a silica cladding 106 and optional outer cladding 108, where the fluorosilicate core 104 comprises a strontium fluoro-alumino-silicate glass. For experimental or commercial use, the fiber amplifier 400 is in optical communication with a pump laser (e.g., laser diode) 314 and a coupler 318, such as a wavelength division multiplexer (WDM), which combines an input signal with light from the pump laser 314 and directs it to the ytterbium-doped optical fiber 102,202. Optical isolators 316 may be positioned between the WDM and an input end of the optical fiber 102,202, and after the output end of the optical fiber 102,202 to avoid unwanted back reflection.

The above-described ytterbium-doped optical fiber may be fabricated using a drawing process referred to as the molten core method. A powder mixture comprising suitable precursor powders, such as $YbF_3$, $SrF_2$, and $Al_2O_3$, is inserted into a silica tube. The precursor powders ($YbF_3$ powder, $SrF_2$ powder, and $Al_2O_3$ powder) may be obtained from commercial sources. The silica tube may be a pure silica tube or a multicomponent oxide tube including other oxides, such as alumina and/or lanthana. The molar ratio of $YbF_3$:$SrF_2$:$Al_2O_3$ may be 5:71.25:23.75, as in the examples described below. After inserting the powder mixture, the silica tube is heated to a temperature of at least about 1850° C., and some or all of the powder mixture undergoes melting, forming a molten core. Similarly, the silica tube softens and/or melts, and the silica tube containing the powder mixture is drawn to obtain a reduced-diameter fiber. The silica tube is generally sealed at the bottom and held vertically. As a consequence of the inherent reactivity between the molten core and the softened cladding, silica is incorporated into the molten core during drawing. After drawing, the reduced diameter fiber cools on transit down the draw tower, and a ytterbium-doped optical fiber comprising a fluorosilicate core surrounded by a silica cladding is formed, where the fluorosilicate core comprises a strontium fluoro-alumino-silicate glass. The silica cladding may be pure silica, i.e., consist essentially of $SiO_2$. Alternatively, the silica cladding may comprise silica and other oxides, such as alumina and/or lanthana. A large length of the ytterbium-doped optical fiber may be obtained using this method (e.g., at least about 5 m, at least about 50 m, or at least about 500 m).

In some cases, an outer cladding may be formed on the silica cladding. The outer cladding may be formed after drawing using a coating process known in the art. Alternatively, the outer cladding may be formed during drawing utilizing a multilayer tube to contain the powder mixture in the core (tube center); the multilayer tube may have an inner layer comprising silica as described above and an outer layer comprising a glass or polymer. The method may further comprise, after cooling, depositing a polymer coating, such as an acrylate coating, on the silica cladding or outer cladding (when present).

As mentioned above, the ytterbium-doped multicomponent fluorosilicate optical fiber exhibits intrinsically low optical nonlinearities. Reductions in the strengths of Brillouin and Raman scattering and a reduced thermo-optic coefficient, dn/dT, are obtained. This is particularly important in raising the threshold for the onset of undesirable phenomena such as thermal lensing and TMI, as it has been shown that the TMI turn-on threshold is inversely proportional to dn/dT. The reduced QD, combined with the intrinsically low measured dn/dT of the fiber (about $5.5 \times 10^{-6}$ $K^{-1}$ or less, or about $5.0 \times 10^{-6}$ $K^{-1}$ or less, and as low as about $4.5 \times 10^{-6}$ $K^{-1}$), represents a potential enhancement to the TMI threshold by up to about 10 dB relative to conventional silica fibers.

In experiments described below, it is found that the laser spectra and slope efficiencies may depend on the active length of the ytterbium-doped optical fiber, which may be defined as the length between splices. With very short active lengths, the pump power is not absorbed completely and some of it leaks from the cavity, degrading lasing efficiency. When the active length is longer than optimal, near-complete pump absorption occurs, but reabsorption of the signal wavelength may lead to a greater likelihood of amplified stimulated emission (ASE), which can degrade the slope efficiency. The optimal active length may depend on pump power, pump and signal wavelengths, core-cladding geometry, etc. Experiments described below reveal that, for a core-pumped configuration, the optimal active length for the ytterbium-doped optical fiber is in a range from about 0.1 m to about 10 m, depending on pump power, core-cladding geometry, and/or other factors.

Experimental Examples

A mixture of high purity commercially available powders is inserted into a silica capillary preform (3 mm inner and 30 mm outer diameters). The initial precursor core composition in mol. % is 71.25 $SrF_2$-23.75 $Al_2O_3$-5 $YbF_3$. The preform is then heated to 2000° C. At this temperature, the preform softens and the precursor materials melt, as is characteristic of the molten core method. The preform is then drawn into a circular core of about 11 μm in diameter and a silica cladding of about 125 μm in outer diameter. As the fiber is drawn, the molten core is effectively kinetically trapped (i.e., quenched) into its metastable glassy state due to the high cooling rates (about 2000° C./s) experienced by the core materials. Silica ($SiO_2$) from the cladding reacts with the molten core during the draw, yielding a graded-index profile strontium fluoro-alumino-silicate glass core surrounded by a pure silica cladding. To protect the fiber, an acrylate coating is deposited in-line (about 250 μm in outer diameter). Approximately 800 m of fiber are drawn.

Figure 5A:
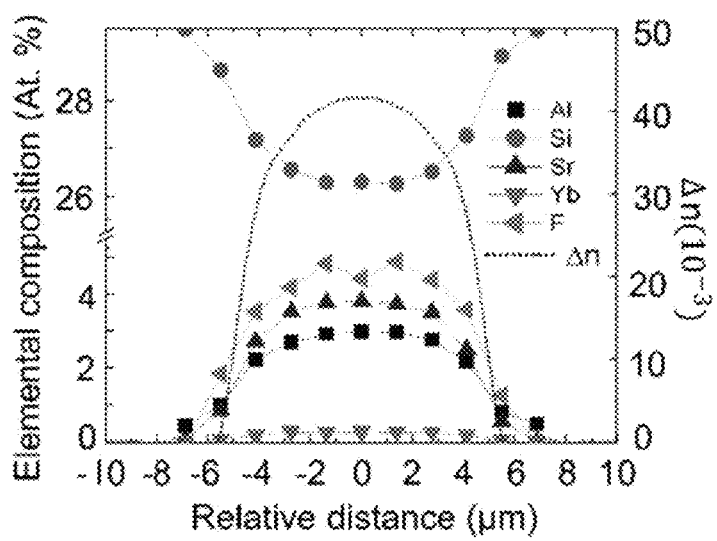
FIGS. 5A and 5B show compositional and refractive index profiles and a scanning electron microscope (SEM) image of an exemplary ytterbium-doped fluorosilicate optical fiber.
Figure 5B:
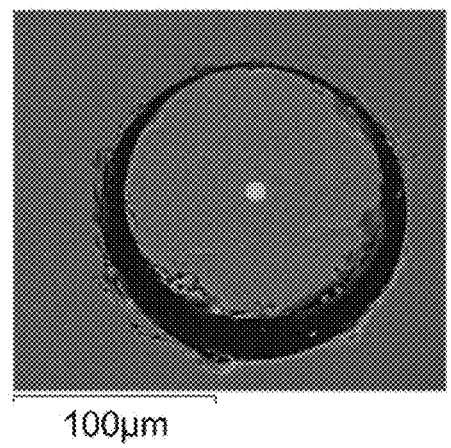

The fabricated optical fiber is a silicate containing the precursor compounds clad in pure silica. Compositional and refractive index profiles, as well as a scanning electron microscope (SEM) image of an exemplary ytterbium-doped optical fiber are provided in FIGS. 5A and 5B, where relative distance represents the distance (in microns) from the center of the fiber core, moving outward in a radial direction. Not shown for reasons of clarity in the composition profile is the oxygen concentration, % O. However, % O (at. %)=100−[% F+% Sr+% Al+% Si+% Yb)]. The fiber possesses a relatively high Δn, and thus high numerical aperture (NA), which may compromise single- or few-mode operation in a large-mode area fiber. However, approaches such as the use of a cladding pedestal design or high-index cladding materials (such as the $SiO_2$-$Al_2O_3$-$La_2O_3$ glass system) may be used to reduce fiber NA.

Figure 6A:
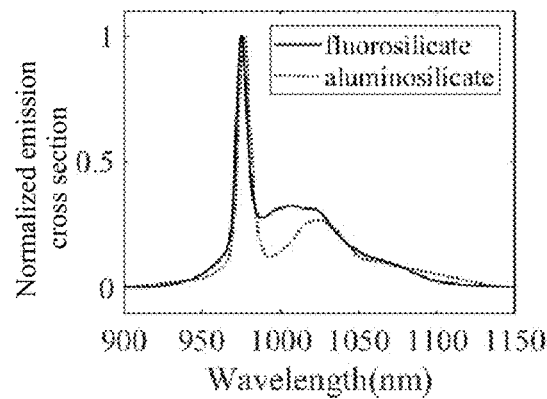
FIGS. 6A and 6B show normalized emission cross section and normalized absorption cross section spectra, respectively, for an exemplary ytterbium-doped fluorosilicate optical fiber and a comparative ytterbium-doped aluminosilicate optical fiber.
Figure 6B:
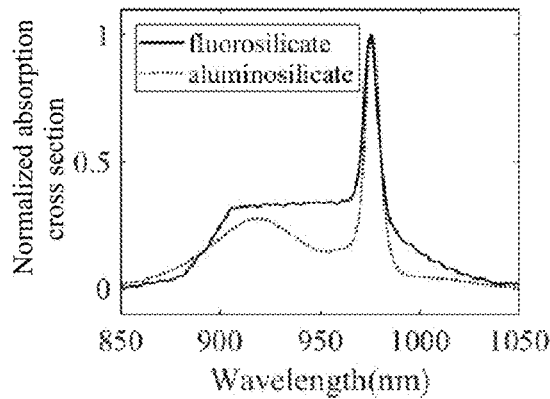

A comparison of the cross section between a ytterbium-doped fluorosilicate fiber fabricated as described above and a commercial aluminosilicate-based fiber is shown in FIGS. 6A and 6B, revealing that the emission spectrum is significantly blue-shifted relative to aluminosilicate glasses, with a local maximum exhibited near 1000 nm. Normalized spectra are provided for visual clarity. While the cross sections are lower in the fluorosilicates, the upper state lifetime is longer, rendering the lifetime-cross section product (at the zero phonon wavelength) nearly identical in the two fibers ($1.9 \times 10^{-27} m^2 s$). Hence, it stands to reason that short-wavelength (<1000 nm) lasers operated utilizing fibers fabricated from these materials may be much easier to realize.

Figure 7A:
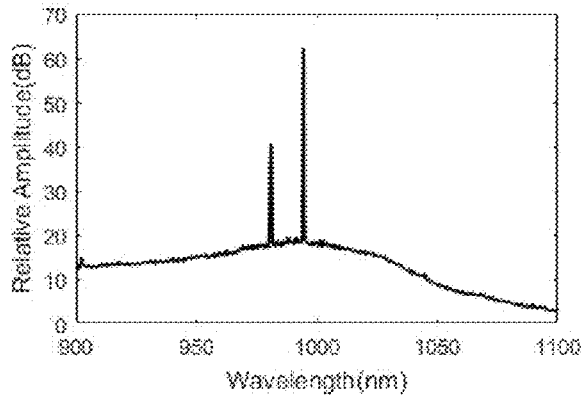
FIG. 7A shows lasing spectrum at 196.5 mW of output power for an exemplary fiber laser based on a ytterbium-doped fluorosilicate optical fiber.

A linear fiber laser such as that illustrated in FIG. 3 is constructed from 0.17 m of the ytterbium-doped optical fiber and a matched pair of FBGs (99.6% and 43.1% reflectivity, 994.5 nm, O/E-Land Inc.). A commercial FBG-stabilized source is used to core-pump the laser, and by straining the FBG stabilizer, the pump is tuned from 977.7 nm to 981 nm. An isolator is placed between the pump and laser sections to avoid feedback from the cavity FBGs unlocking the wavelength of the pump. This is validated in FIG. 7A where the lasing spectrum shows some pump leakage at 981 nm (approx. 22 dB below lasing power). The QD in this system is 1.36% and amplified spontaneous emission (ASE) is substantially suppressed yielding 45 dB optical signal to noise ratio (OSNR).

Figure 7B:
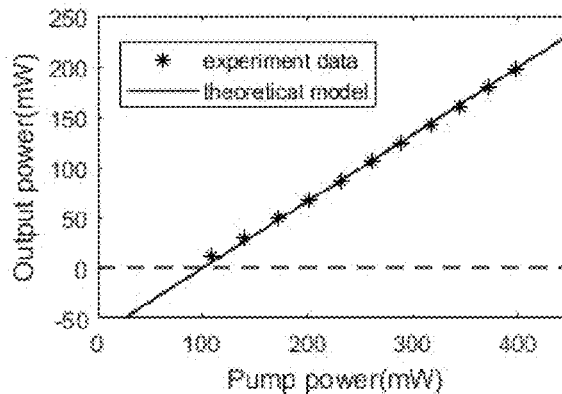
FIG. 7B shows theoretical and experimental results for output power versus input power for an exemplary fiber laser based on a ytterbium-doped fluorosilicate optical fiber.

FIG. 7B shows the experimental output power versus pump power when pumping at 981 nm and lasing at 994.5 nm. The slope efficiency is measured to be 64%, impacted mainly by the splice losses between the active fiber and the optical fibers containing the cavity FBGs. Estimating the splice losses to be 0.2 dB and including a background loss of 1.36 dB/m at the lasing wavelength, a theoretical calculation provides an excellent match to the measured data, suggesting that slope efficiencies exceeding 98% should ultimately be possible. Operating the pump laser at 977.7 nm offered no substantive difference to operating at 981 nm for the same ytterbium-doped optical fiber length.

In other experiments, low QD lasers based on the ytterbium-doped optical fibers were studied to optimize lasing conditions and slope efficiencies. Two low-QD cases were investigated: (1) pumping at 976.6 nm and lasing at 985.7 nm, and (2) pumping at 981 nm and lasing at 989.8 nm, indicating QDs of 0.92% and 0.90%, respectively. These cases were selected as examples of pumping near the peak of and on the red side of the zero phonon line, respectively. The experimental configuration for both are similar and represented by the schematic of FIG. 3.

Commercial, fiber Bragg grating (FBG)-stabilized, fiber-coupled, single-mode diode lasers are used as pumps. For 976.6 nm pumping, an S31-7602 model laser (Lumentum Operations LLC) is used directly. For 981 nm pumping, the FBG stabilizer of the source (FOL0908A45-H17-977.6, Furukawa Electric Co., Ltd.) is strained in order to tune the pumping wavelength from 977.6 to 981 nm. Matched pairs of FBGs (99.18% reflectivity at 989.77 nm and 39.61% reflectivity at 989.77 nm; 99.02% reflectivity at 985.74 nm and 38.34% reflectivity at 985.77 nm; O/E-Land Inc.) are used to construct the cavity. An isolator is placed between the pump and the cavity in order to avoid having reflections from cavity FBGs destabilize the pumping wavelength, which, as will be shown, is validated in FIGS. 8A and 8B. There, the spectra indicate pump leakage to be at the correct wavelength of 976.6 nm.

Figure 8A:
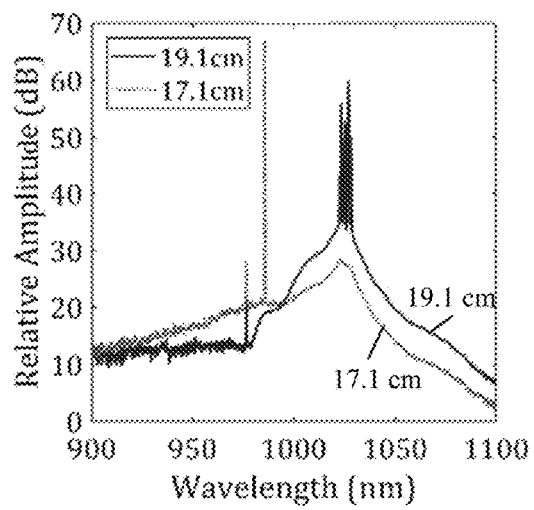
FIGS. 8A and 8B show output spectra for exemplary fiber lasers with 976.6 nm pump wavelength and ytterbium-doped optical fiber length of (A) 19.1 cm, 17.1 cm and (B) 15.4 cm, 11.4 cm showing the evolution of ASE with active fiber length; measurements were made with a pump power of 624 mW.
Figure 8B:
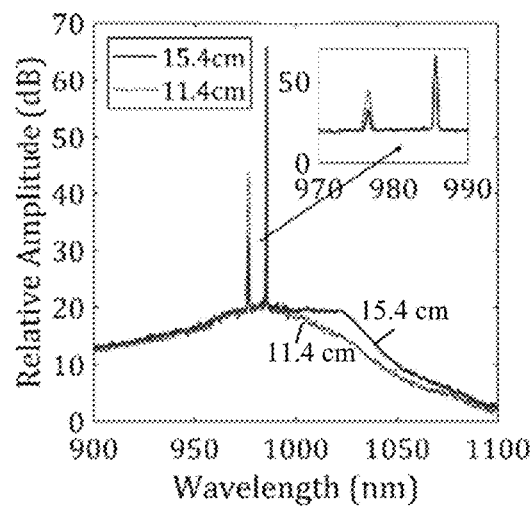

In order to optimize the lasing conditions and slope efficiencies, experiments started with a relatively long piece of Yb-doped fiber (around 20 cm), which then was shortened in roughly 1.5 cm increments to a final length of ~10 cm. For each increment, the output spectrum was recorded using an optical spectrum analyzer (OSA), and the laser output power versus pump power was measured using a calibrated optical power meter. FIGS. 8A and 8B provide representative examples of the spectral measurements for 976.6 nm pumping using four different active fiber lengths. A similar trend (described below) of spectral variation was also observed for the 981 nm pumping case, and plots are, therefore, not shown here. FIG. 9A provides the slope efficiency measured for the different fiber lengths, whereas FIG. 9B shows lasing data (versus launched pump power) at the maximum slope efficiency, including a comparison to theoretical results. For convenience, in FIG. 9B, the 981 and 976.6 nm pumping scales were offset for visual clarity. Pump leakage was subtracted from all the measured power data.

The spectra and slope efficiencies vary significantly with fiber length. With a very short length (for example, 8 cm), the pump power is not absorbed completely and much of it leaks from the cavity, therefore degrading lasing efficiency. When the fiber is longer than optimal, near-complete pump absorption occurs. However, the noninverted length of fiber imparts reabsorption to the signal wavelength, which leads to a greater likelihood of ASE, thereby also results in a degradation of the slope efficiency. With longer fiber lengths, ASE ultimately dominates the lasing process, and self-oscillation occurs near the ASE peak wavelength (~1022 nm). Referring again to FIG. 8A shows the emission spectra when a longer-than-optimal fiber length is employed. At 19.1 cm, self-oscillation is observed, while for 17.1 cm, significant ASE is produced. FIG. 8B provides spectra near the optimal fiber length. With relative lasing power set to the same level (65.7 dB), a fiber length of 15.4 cm leads to a leaked pump power level of ~12 dB lower but with an ASE level that is ~4.4 dB higher than when using 11.4 cm of fiber.

It is clear that greater pump absorption can increase the slope efficiency, while greater ASE can decrease the slope efficiency. Therefore, with decreasing length from ~20 cm, the slope efficiency is expected to increase at first as the ASE level is reduced, reach an optimal point, and then decline as incomplete pump absorption takes place. This is precisely the trend observed in FIG. 9A. The power data for the near-optimal fiberlengths (11.4 and 15.6 cm for 976.6 and 981 nm pumping, respectively) for the two cases are shown in FIG. 9B. Corresponding slope efficiencies are measured to be 62.1% and 56.8%. Note that the output power was pump-limited when lasing at 989.8 nm.

The slope efficiency does not reach the theoretical quantum limit (>99%) mainly because of the splice losses between the Yb-doped fiber and the cavity FBGs (written into 1060-nm-type single-mode fiber) as well as background loss. Background loss (~1.36 dB/m) is mainly due to scattering and impurity absorption, while splice loss (~0.16 and ~0.48 dB/splice for the 976.6 and 981 nm pumping cases, respectively) is influenced mainly by spatial mode competition within the cavity, with the observation that the output power may change significantly when bending or twisting the fiber. This, coupled with some variation of splice loss each time, leads to the data observed in FIG. 9A. Pumping at 981 nm indicated a somewhat lower maximum slope efficiency relative to pumping at 976.6 nm. This can be explained by its longer optimal length and therefore larger total background loss, in addition to greater splice loss. Work is currently underway to reduce the background losses in these fibers. Additionally, a reduction in the fiber numerical aperture should render improved splice quality. Modeling results indicate that if the background loss can be largely eliminated, along with attaining a 0.16 dB loss per splice for both cases, the achievable slope efficiencies may be 80.7% for 981 nm pumping and 68.3% for 976.6 nm pumping. Modeling results also indicate that with further improvements to splice quality, optimization of FBG reflectivity, and concomitant fiber length, slope efficiencies approaching the quantum limit are feasible. However, low-QD operation is of much more significance in any subsequent power amplifier stages.

Finally, it also is observed that a higher pump leakage occurs for the 981 nm pump case for the same length of fiber. This is shown in FIG. 10, where the difference between signal output and pump leakage powers as a function of fiber length is provided. This observation can be explained by the difference in the cross sections at the various wavelengths. The absorption cross section at 976.6 nm is approximately twice that at 981 nm, which leads to greater pump absorption for a given active fiber length. At the same time, the emission cross section at 985.7 nm also is slightly larger than at 989.8 nm, which results in somewhat more effectual stimulated emission. These two processes, taken together, bring about the results shown in FIG. 10, where 976.6 nm pumping not only suggests a larger power difference for a given length, but also a stronger dependence on change in that length. The uncertainty associated with the measurements in FIG. 10 are roughly ±0.5 dB due to the resolution of the OSA.

Demonstrated here were two less-than-1% QD fiber laser configurations based on an ytterbium-doped multicomponent fluorosilicate optical fiber, having reached a maximum slope efficiency of 62.1%. Higher slope efficiencies can be expected with less splice and background losses. Modeling results indicate that with additional laser optimization (FBG reflectivity and active fiber length), slope efficiencies approaching the quantum limit may be possible in a core-pumped configuration.

Although the present invention has been described in considerable detail with reference to certain embodiments thereof, other embodiments are possible without departing from the present invention. The spirit and scope of the appended claims should not be limited, therefore, to the description of the preferred embodiments contained herein. All embodiments that come within the meaning of the claims, either literally or by equivalence, are intended to be embraced therein.

Furthermore, the advantages described above are not necessarily the only advantages of the invention, and it is not necessarily expected that all of the described advantages will be achieved with every embodiment of the invention.

The invention claimed is:

1. A rare earth-doped optical fiber comprising:
a fluorosilicate glass core surrounded by a silica cladding, the fluorosilicate glass core comprising an alkaline-earth fluoro-alumino-silicate glass, the silica cladding consisting essentially of $SiO_2$, the fluorosilicate glass core having an initial precursor core composition in mol. % of 71.25 $SrF_2$-23.75 $Al_2O_3$-5 $YbF_3$.

2. The rare earth-doped optical fiber of claim 1, further comprising an outer cladding layer on the silica cladding, the outer cladding layer comprising a polymer or a glass.

3. The rare earth-doped optical fiber of claim 2, wherein the polymer comprises a fluorinated polymer.

4. The rare earth-doped optical fiber of claim 1, wherein the fluorosilicate glass core has a diameter in a range from about 5 microns to about 100 microns.

5. The rare earth-doped optical fiber of claim 1, wherein the silica cladding has an outer diameter in a range from about 100 microns to about 600 microns.

6. A fiber laser comprising the rare earth-doped optical fiber of claim 1 and exhibiting a quantum defect of less than 1.5%.

7. The fiber laser of claim 6, wherein the quantum defect is less than 1%.

8. The fiber laser of claim 6, further comprising reflectors in optical communication with the rare earth-doped optical fiber for increasing optical power, the reflectors defining an optical cavity.

9. The fiber laser of claim 8, wherein the reflectors comprise first and second fiber Bragg gratings (FBGs), the first FBG being spliced to an input end of the rare earth-doped optical fiber and the second FBG being spliced to an output end of the rare earth-doped optical fiber.

10. A fiber amplifier comprising the rare earth-doped optical fiber of claim 1.

* * * * *